United States Patent Office 2,928,881
Patented Mar. 15, 1960

2,928,881

PROCESS OF MAKING PARA-CRESOL

Gaylord K. Finch, Kingsport, Tenn., assignor to Eastman Kodak Company, Rochester, N.Y., a corporation of New Jersey No Drawing. Application March 31, 1958
Serial No. 724,804

4 Claims. (Cl. 260—621)

This invention relates to a new process of making para-cresol, by the dehydrocyclization of 5-methyl-4-hexene-2-one. The raw materials for this process are isobutyraldehyde and acetone. These react, in the presence of alkali, to form the ketol 5-methyl-4-hydroxy-2-hexanone, as described by Eccott and Linstead in J. Chem. Soc., Transactions 1930, page 917. 5-methyl-4-hydroxy-2-hexanone may be dehydrated to 5-methyl-4-hexen-2-one as shown in U.S. Patent 2,139,360 or in U.S. Patent 2,312,-751. I prefer, however to dehydrate the ketol, by means of $KHSO_4$ or $H_3PO_4$, to the trans isomer of 5-methyl-3-hexen-2-one,

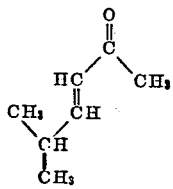

and then to rearrange this compound to the beta-gamma isomer, 5-methyl-4-hexen-2-one,

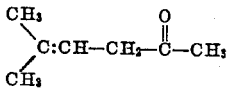

by heating above 110° C. for 1 hour with 0.02% $I_2$ as catalyst. A 90% yield is obtained in each of these two steps. Phosphoric acid, sulfuric acid, and even acetic acid will catalyze this rearrangement, but much more slowly than iodine.

I have discovered that when 5-methyl-4-hexen-2-one is passed over a suitable dehydrogenating catalyst within suitable temperature limits, the compound is dehydrogenated and cyclized to give p-cresol.

Dehydrogenating catalysts which I have found suitable for carrying out this reaction include iron oxide promoted with copper and/or chromium; copper chromite promoted with antimony oxide; mixed copper and chromium oxides promoted with barium oxide; a mixture of copper, chromium, barium and tin oxides on diatomaceous earth; copper zinc chromite; nickel on alumina; and nickel on a mixture of alumina and magnesia.

The temperature range within which the reaction may be carried out is from 450–650° C. I have obtained higher yields at temperatures of from 470–550° C. than at higher or lower temperatures. I have obtained better yields at atmospheric or reduced pressure than at elevated pressure.

The contact time may be from 0.01 second to 20 seconds. I prefer to use a contact time of from 0.2 second to 2.0 seconds. The flow rate as well as the contact time appears to be important, as different reactor designs using the same feed and conditions have given different results. For example, a short, squat reactor gave significantly higher yields than a long slender reactor of the same volume.

I have found it best to dilute the 5-methyl-4-hexen-2-one with steam, hydrogen, nitrogen or benzene. I prefer to use steam, at a 7:1 to 20:1 molar ratio of steam to 5-methyl-4-hexen-2-one. At the high reaction temperatures used, some carbon is bound to be formed and deposited on the catalyst. Steam used in the feed probably reacts with the carbon to form carbon monoxide and hydrogen, thus helping to keep the catalyst active by removing most of the carbon as it is formed. After the catalyst has become deactivated, it can be reactivated by passing steam, air, or a mixture of steam and air through it for a suitable period of time and at a suitable temperature depending on the catalyst and the conditions used, such as 1 to 3 hours at 200°–600° C.

The activity of the catalyst is very critical for good yields. For example: New or freshly activated iron oxide catalysts gave considerable off-gas and only a 3 to 4% yield of p-cresol during the first hour of a run. The off-gas then markedly decreased, and the percent yield of p-cresol increased to from 26 to 27% for several hours, then gradually decreased to the extent of from 3 to 7% after several more hours. At the same time, however, a compound tentatively identified as 5-methyl-3,5-hexadiene-2-one gradually increased in concentration. This material, on recycling, produces primarily p-cresol and 5-methyl-4-hexen-2-one. By removing the p-cresol from the reactor effluent, e.g. by use of a caustic scrubber, the unreacted 5-methyl-4-hexen-2-one and any 5-methyl-3,5-hexadiene-2-one can be recycled to the reactor, thus materially increasing the yield.

The following examples are given as illustrations of the practice of my invention.

*Example 1.*—The reactor consisted of a tube of heat-resistant glass, 1 inch in diameter and 6 inches long, which was wrapped with Nichrome heating wire. (Nichrome is an alloy containing approximately 60% nickel, 24% iron, 16% chromium, and 0.1% carbon.) The unit was equipped with a thermocouple to measure the hot spot temperature, and was charged with ⅜″ x 5/16″ pellets of an iron oxide base, copper-promoted catalyst (Girdler G–5). The 5-methyl-4-hexen-2-one and steam were metered through separate preheaters and mixed just before entering the catalyst chamber. The mole ratio of steam to ketone was 10:1, and the feed was adjusted to give a contact time of 0.8 second with the catalyst at 600° C. From 112 g. (130 ml.) of ketone, 3.7 cu. ft. of off-gas was obtained, comprising 5 g. $H_2$, 14 g. hydrocarbons, and 10 g. of C as $CO_2$, along with small amounts of CO, $O_2$ and $N_2$. The condensate from the unit (95 g., including some water and byproducts) analyzed as 13.8% p-cresol by infrared spectroscopy, and 51% 5-methyl-4-hexen-2-one by vapor phase chromatography, giving a yield of 19.2%.

*Example 2.*—The reactor consisted of a tube of heat-resistant glass, 1 inch in diameter and 3 feet long, heated by an electric furnace. Both the preheater and catalyst bed temperatures were controlled by Wheelco controllers. The steam and the 5-methyl-4-hexen-2-one, in a mole ratio of 6:1, were metered and preheated separately, and mixed just before entering the catalyst chamber. The mixture was fed to give a contact time of 0.6 second. The catalyst was a chromium-promoted iron oxide catalyst (Girdler G–3), and was maintained at 600° C. The volume and the composition of the off-gas were the same initially as in Example 1. It was observed that the volume of off-gas and the percent of p-cresol in the product both decreased gradually over a 4 hour run. At the end of the run the catalyst was covered with carbon. The activity of the catalyst was restored by burning off the carbon with a mixture of steam and air at 450–550° C. The crude product was extracted with 20% NaOH, and the alkaline layer washed with ether and then acidified, to give a thick phenolic layer. This layer was distilled to give p-cresol, containing a small amount of o-cresol. The p-cresol was identified by melting point, and by the melting point of its naphthylurethane. The melting point of the naphthylurethane was not depressed when mixed with an authentic sample of p-cresol naphthylurethane. The yield of p-cresol, based on 5-methyl-4-hexen-2-one, was 15%.

*Example 3.*—A mixture of equal parts by weight of benzene and 5-methyl-4-hexen-2-one was passed for one hour over a copper oxide-chromium oxide catalyst promoted with barium oxide and antimony oxide on a diatomaceous earth support in a reactor similar to that described in Example 2, at an absolute pressure of 50 millimeters of mercury and a temperature of 475°–480° C., with a contact time of 0.5 second. A 34.4% yield of p-cresol was obtained.

*Example 4.*—5-methyl-4-hexen-2-one was passed for seven hours through the same unit and catalyst as in Example 3, at an absolute pressure of 50 mm. Hg and a temperature of 480°–487° C., with a contact time of 2 seconds. A 24.1% yield of p-cresol was obtained.

I have also obtained p-cresol in a similar manner, though in lower yields, from trans-5-methyl-3-hexen-2-one, described by Eccott and Linstead, page 909–10, and from 5-methyl-5-hexen-2-one, described (as methallyl acetone) by Kimel and Cope, J. Am. Chem. Soc. 65, 1992–8 (1943) (Chemical Abstracts 38, 664).

What I claim as my invention and desire to be secured by Letters Patent of the United States is:

1. A process of manufacturing p-cresol, which comprises dehydrogenating and cyclizing 5-methyl-4-hexen-2-one by passing it over a dehydrogenating catalyst at a temperature of from 450° to 650° C.

2. A process of manufacturing p-cresol, which comprises dehydrogenating and cyclizing 5-methyl-4-hexen-2-one by passing it over a dehydrogenating catalyst at a temperature of from 470° to 550° C.

3. A process of manufacturing p-cresol, which comprises passing 5-methyl-4-hexen-2-one in admixture with steam over a dehydrogenating catalyst at a temperature of from 450° to 650° C.

4. A process of manufacturing p-cresol, which comprises dehydrogenating and cyclizing a methyl hexenone selected from the group consisting of 5-methyl-4-hexen-2-one, trans-5-methyl-3-hexen-2-one, and 5-methyl-5-hexen-2-one by passing it over a dehydrogenating catalyst at a temperature of from 450° to 650° C.

References Cited in the file of this patent

UNITED STATES PATENTS

| | | |
|---|---|---|
| 2,369,197 | Winkler et al. | Feb. 13, 1945 |